(12) United States Patent
Chapman et al.

(10) Patent No.: US 7,332,120 B2
(45) Date of Patent: Feb. 19, 2008

(54) METHOD FOR MOLDING RUNNING BOARD WITH STEP PLATE

(75) Inventors: Timothy W. Chapman, Etobicoke (CA); Changize Sadr, North York (CA)

(73) Assignee: Salflex Polymers Ltd., Weston, Ontario (CA)

( * ) Notice: Subject to any disclaimer, the term of this patent is extended or adjusted under 35 U.S.C. 154(b) by 860 days.

(21) Appl. No.: 10/673,316

(22) Filed: Sep. 30, 2003

(65) Prior Publication Data

US 2005/0067741 A1 Mar. 31, 2005

(51) Int. Cl.
*B29C 49/20* (2006.01)
(52) U.S. Cl. .................. 264/511; 264/515; 264/516
(58) Field of Classification Search .............. 264/511, 264/515–16
See application file for complete search history.

(56) References Cited

U.S. PATENT DOCUMENTS

| 4,246,734 | A | * | 1/1981 | Fogle et al. .......... 52/309.16 |
| 4,634,566 | A | * | 1/1987 | Schlenz ................. 264/515 |
| 4,664,958 | A | | 5/1987 | Jones |
| 4,719,072 | A | | 1/1988 | Kojima |
| 4,824,504 | A | | 4/1989 | Kagata |
| 4,877,147 | A | | 10/1989 | Hyde |
| 5,114,522 | A | | 5/1992 | Takado et al. |
| 5,658,027 | A | * | 8/1997 | Eissinger et al. ........ 293/120 |
| 6,136,259 | A | | 10/2000 | Puffenberger et al. |
| 7,011,787 | B2 | * | 3/2006 | Huse .................... 264/516 |
| 7,125,466 | B2 | * | 10/2006 | Cooper et al. ........ 156/244.14 |

FOREIGN PATENT DOCUMENTS

| JP | 2003 236920 | 8/2003 |
| WO | WO 95/13938 | 5/1995 |

* cited by examiner

*Primary Examiner*—Suzanne E. McDowell
(74) *Attorney, Agent, or Firm*—Bereskin & Parr

(57) ABSTRACT

A process for making a molded running board assembly for installation on a vehicle includes blow molding the body of the running board and incorporating one or more additional components such as a step plate or a trim strip. The process involves placing the insert into the blow mold cavity in a subcavity, holding the insert by vacuum pressure and then extruding and blow molding a parison to simultaneously mold the running board and integrate the insert.

17 Claims, 12 Drawing Sheets

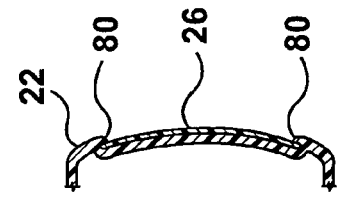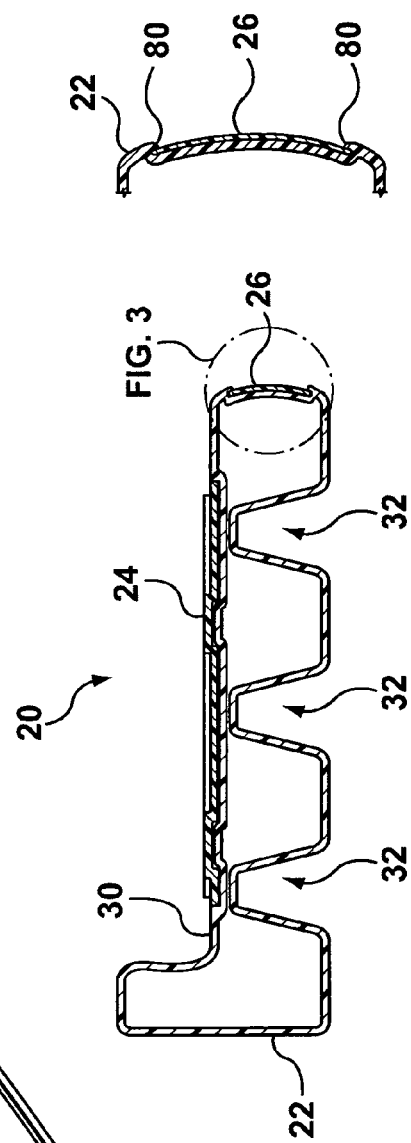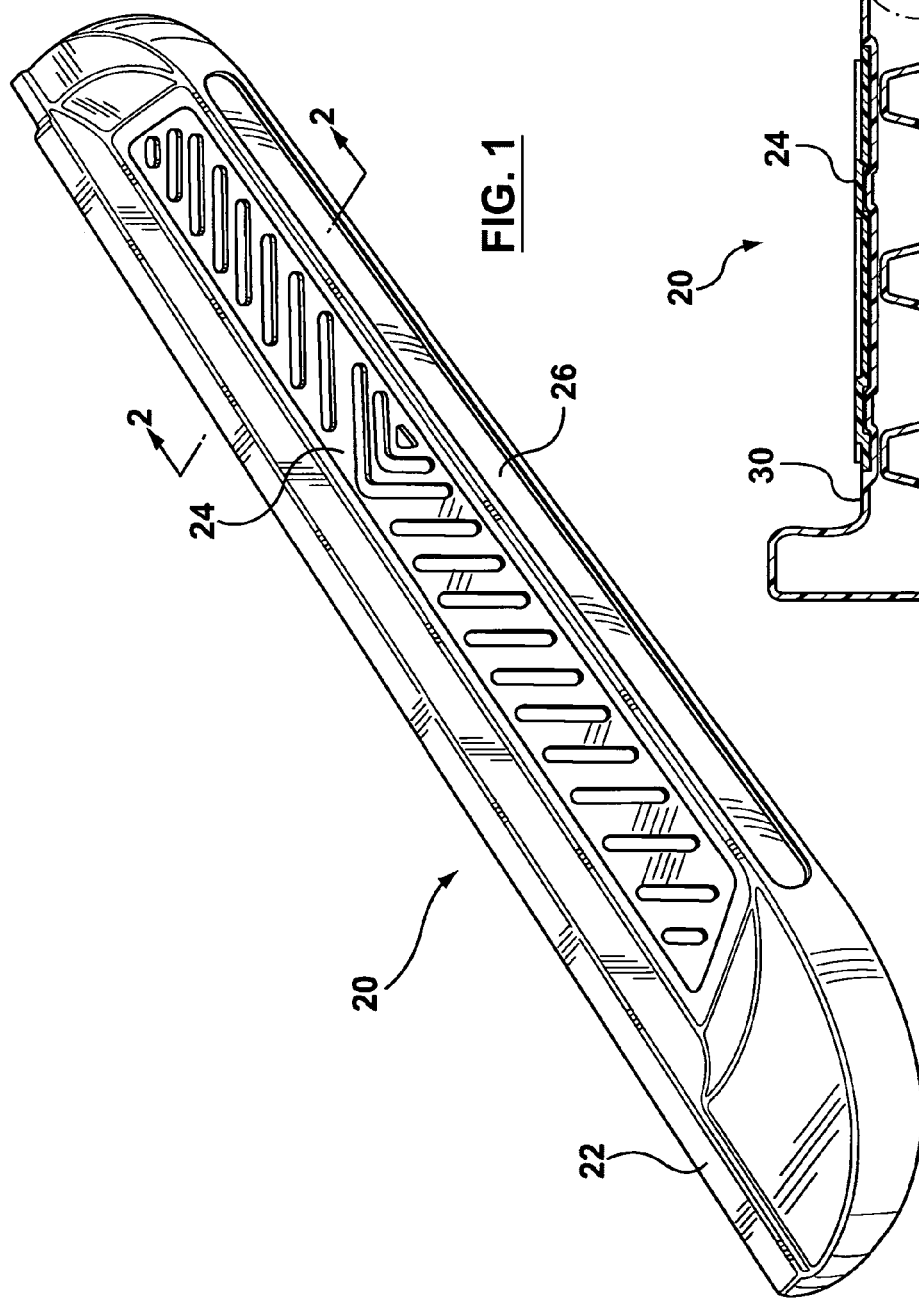

METHOD FOR MOLDING RUNNING BOARD WITH STEP PLATE

FIELD OF THE INVENTION

This invention relates to a method of producing a running board for a motor vehicle. In particular, the invention relates to a method of creating a running board which includes a step plate and optionally one or more trim inserts.

BACKGROUND OF THE INVENTION

Many motor vehicles which are mounted on large wheels and tires or have raised suspension systems, have a vehicle floor which is well above the road surface on which the vehicle travels. Many such vehicles are provided with a step to facilitate entry into the vehicle. These are often referred to as a running board. Typically, running boards are used on trucks or sport utility vehicles or the like. The running board provides a structural step which projects outwardly from the rocker panel area of the vehicle and gives enough supporting surface area to support the foot of a person desiring entry or exit from a vehicle. The running board may be a separate structure from the rocker panel and requires structural support to support the load of the person standing on the running board when entering or leaving the vehicle. The running board, when installed, will have an upper supporting surface on which the person using the running board, steps. The surface extends along the length of the running board but may be relatively narrow. Accordingly, it is desirable that the surface on which the user steps, includes a step pad. The step pad may include raised portions to provide a traction aid to help resist slipping of the user's foot off the surface as the user applies weight to their foot. The step pad may also include patterns of raised and lowered areas, ribs and the like which provide a pleasing visual appearance to the installed running board.

A running board has an outer surface which is highly visible, extending between the front and rear wheels of the vehicle. It is often desirable to include one or more trim strips which may extend along portions of the running board to enhance the appearance of the running board and the vehicle on which the running board may be installed.

The blow molding procedure is a very cost efficient way of producing items which have a hollow structure and may be used to produce items requiring structural strength such as running boards. Accordingly, it is desirable to use the blow molding process to create such running boards.

In order to meet all of the desired criteria of appearance, structural strength and anti-slip characteristics, running board assemblies may include a pluralities of parts. These may include the running board itself, a step pad and one or more trim pieces.

It would be desirable to create a subassembly including all of these components for manufacture by an automotive equipment supplier for shipment to automotive assembly plants where the running board subassembly may then be assembled to the vehicle.

Accordingly, there exists a need to produce the components for such a subassembly and to create the subassembly in a commercially economic fashion.

SUMMARY OF THE INVENTION

In accordance with this invention, a process for making a running board assembly of a running board and an insert comprises providing complementary mold components having respective molding cavities. At least one of the mold components has at least one insert subcavity within the cavity of that mold component. The process includes providing an insert. The process further includes inserting the insert into the subcavity and applying vacuum pressure into the subcavity to hold the insert in place. A parison is then extruded between the mold components. The mold components are closed and the parison is expanded within the closed cavity of the mold components to simultaneously mold the running board and to integrate the insert and the running board to produce the running board assembly.

In accordance with one aspect of the invention, the insert is a step plate.

In accordance with another aspect of the invention, the insert is a trim piece.

In accordance with a particularly preferred embodiment of the invention, the step plate is formed of a moldable, anti-slip material which is compatible for thermal bonding with the parison. In a further preferred aspect of the invention, the process includes the step of expanding the parison so that the parison contacts the moldable step plate to raise its temperature to a temperature suitable for molding. The process further includes expanding the parison to force the moldable step plate against a molding pattern within the subcavity to mold a surface of the step plate and at the same time incorporate the step plate into the running board formed from the parison.

In accordance with a further aspect of the invention, the step plate may be formed from a metallic material and the step plate includes at least one key shaped rib. In accordance with a preferred embodiment of this aspect of the invention the process includes the step of blow molding the parison against the metallic step plate so that the key shaped rib is encapsulated within the molded parison.

In accordance with another aspect of the invention, the insert is a trim strip which is not thermally bondable with the parison. In a preferred embodiment of this aspect of the invention, the subcavity includes an undercut around at least a portion of the perimeter of the subcavity so that upon expansion of the parison, a portion of the parison may flow into the undercut.

Various other aspects and objects of the invention may be understood from reference to the following description of preferred embodiments of the invention and the following drawings.

BRIEF DESCRIPTION OF THE DRAWINGS

FIG. 1 is a top perspective view of a running board assembly in accordance with a first embodiment of the invention;

FIG. 2 is a cross section through the running board assembly of FIG. 1 taken along the lines 2-2 shown in FIG. 1;

FIG. 3 is an expanded view of a portion of the cross-section illustrated in FIG. 2;

DETAILED DESCRIPTION OF THE INVENTION

Figure 4:
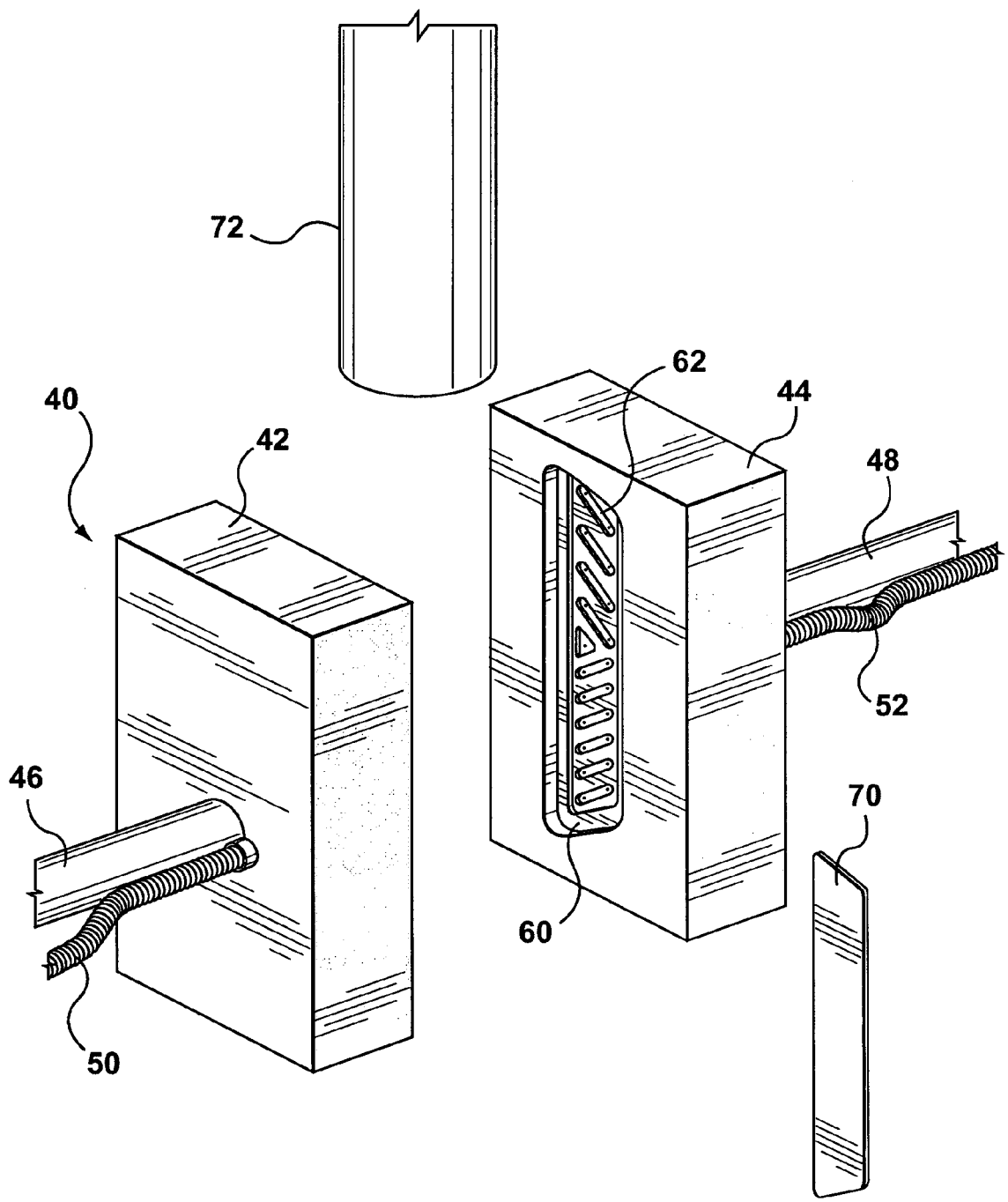
FIGS. 4 through 11 illustrate various steps of the process in accordance with the preferred embodiment of the invention.

FIG. 1 illustrates a running board assembly generally at 20. The running board assembly comprises a running board 22, a step pad 24 and a trim strip 26.

The running board 22 has an upper support surface 30. The step pad 24 is adhered to the supporting surface 30 in accordance with the process of this invention which is explained more fully below. The running board 22 may be formed in a blow molding procedure. From review of FIG. 2, it will be noted that the running board includes a plurality of recesses 32 which may be formed by moving components within a blow mold in a known fashion. The recesses 32 bring the internal surface of the parison in contact with an opposite portion to form a plurality of ribs. These ribs provide the structural strength to the blow molded running board so that it meets the necessary structural requirements. Any pattern of ribs may be formed so as to provide sufficient strength to the running board 22.

The process will now be explained in greater detail with reference to FIGS. 4 through 11. FIG. 4 illustrates diagrammatically the blow molding mold 40. The blow molding mold comprises a first mold half or component 42 and a complementary mold half or component 44. Diagrammatically, the mold halves 42 and 44 are shown as being movable toward and away from each other by rams 46 and 48 respectively. The mold halves 42 and 44 each have supply conduits 50 and 52 respectively. The supply conduits 50 and 52 supply cooling fluids as need be. In addition, the supply conduit 52 also includes a source of vacuum pressure as will be explained more fully below.

The mold halves 42 and 44 each include a mold cavity. In the view illustrated in FIG. 4, only the cavity 60 within mold half 44 is visible. The mold cavity 60 determines the shape of a portion of the running board and includes the necessary configuration to mold a substantial portion if not all of the support surface 30. The mold cavity 60 within the mold half 44 also includes a subcavity 62. The subcavity 62 includes a configuration for molding a desired pattern on what will become the upper surface of a step pad.

In accordance with this aspect of the invention, a process includes providing a moldable step plate 70 and the extrusion of a parison 72. The parison 72 may be extruded from a well known extrusion head.

Figure 5:
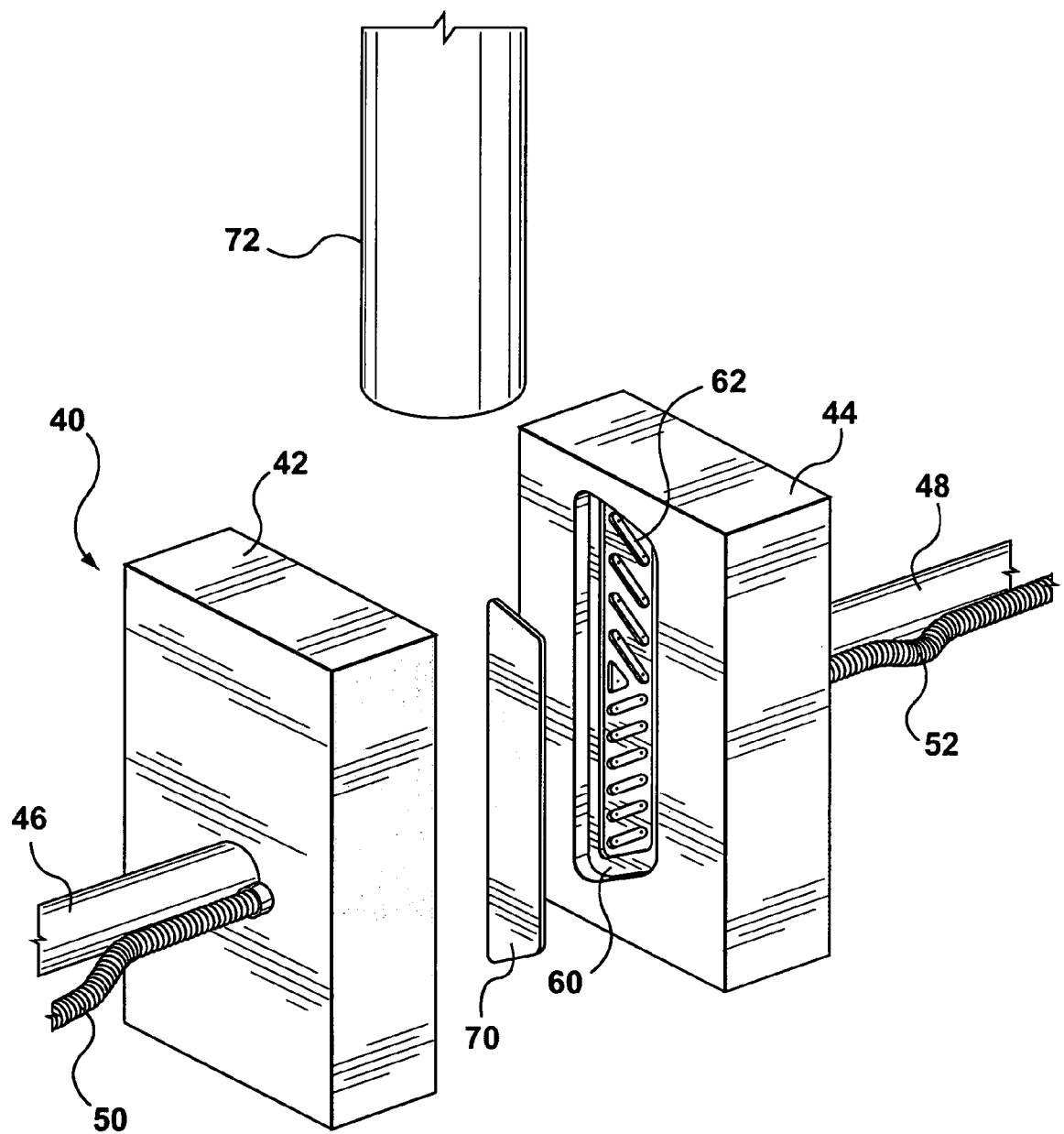
Figure 6:
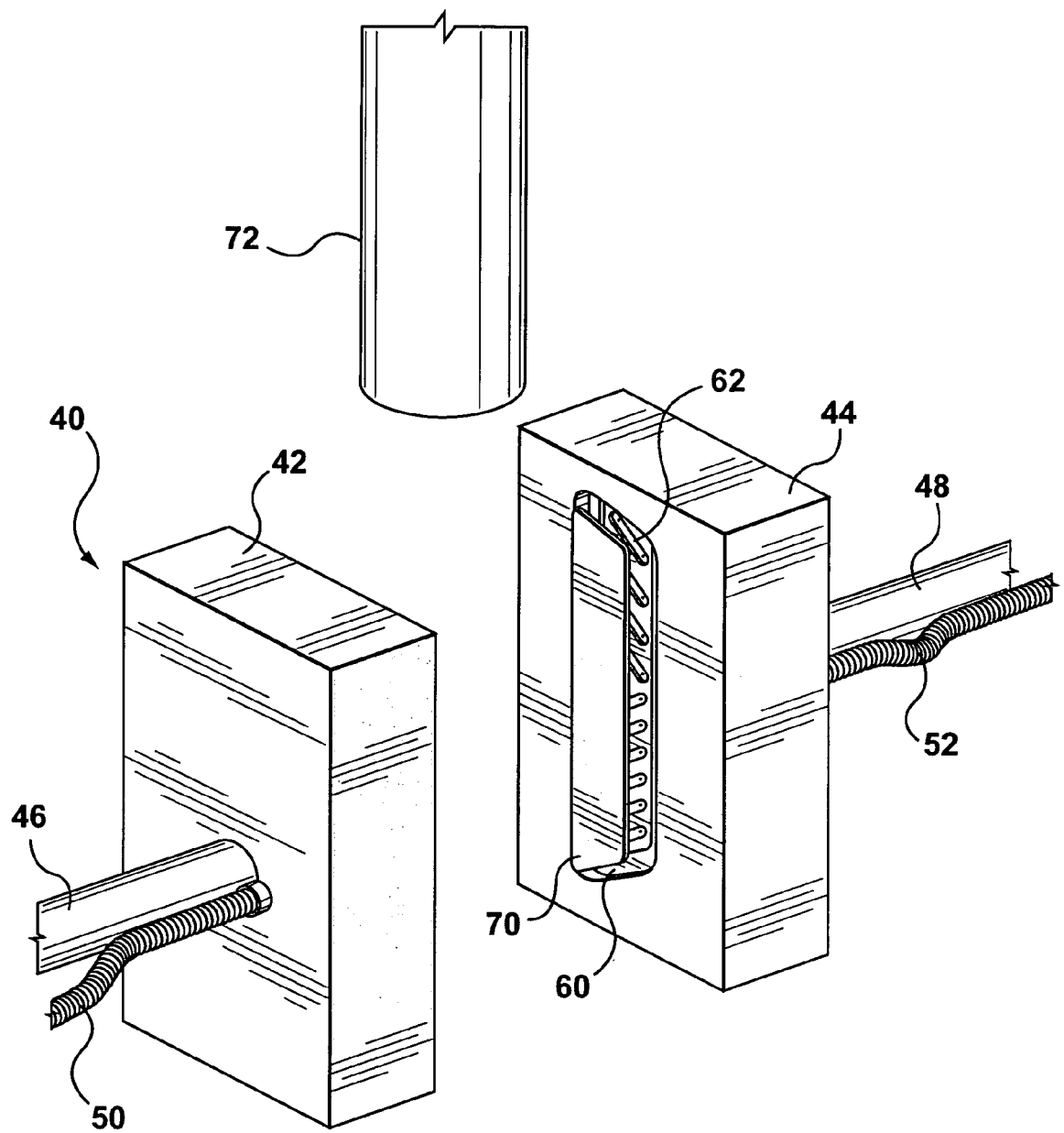
Figure 7:
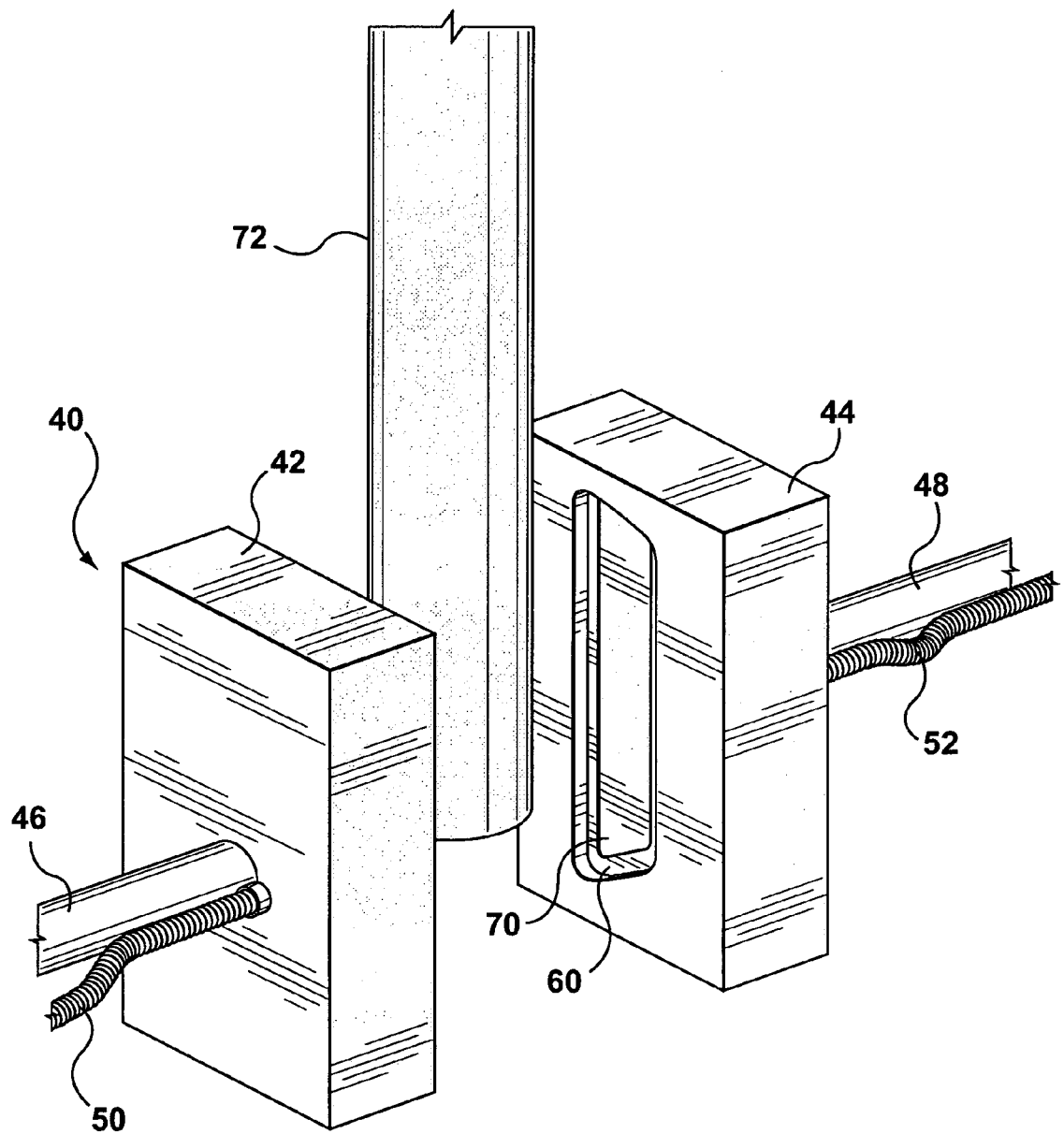
Figure 8:
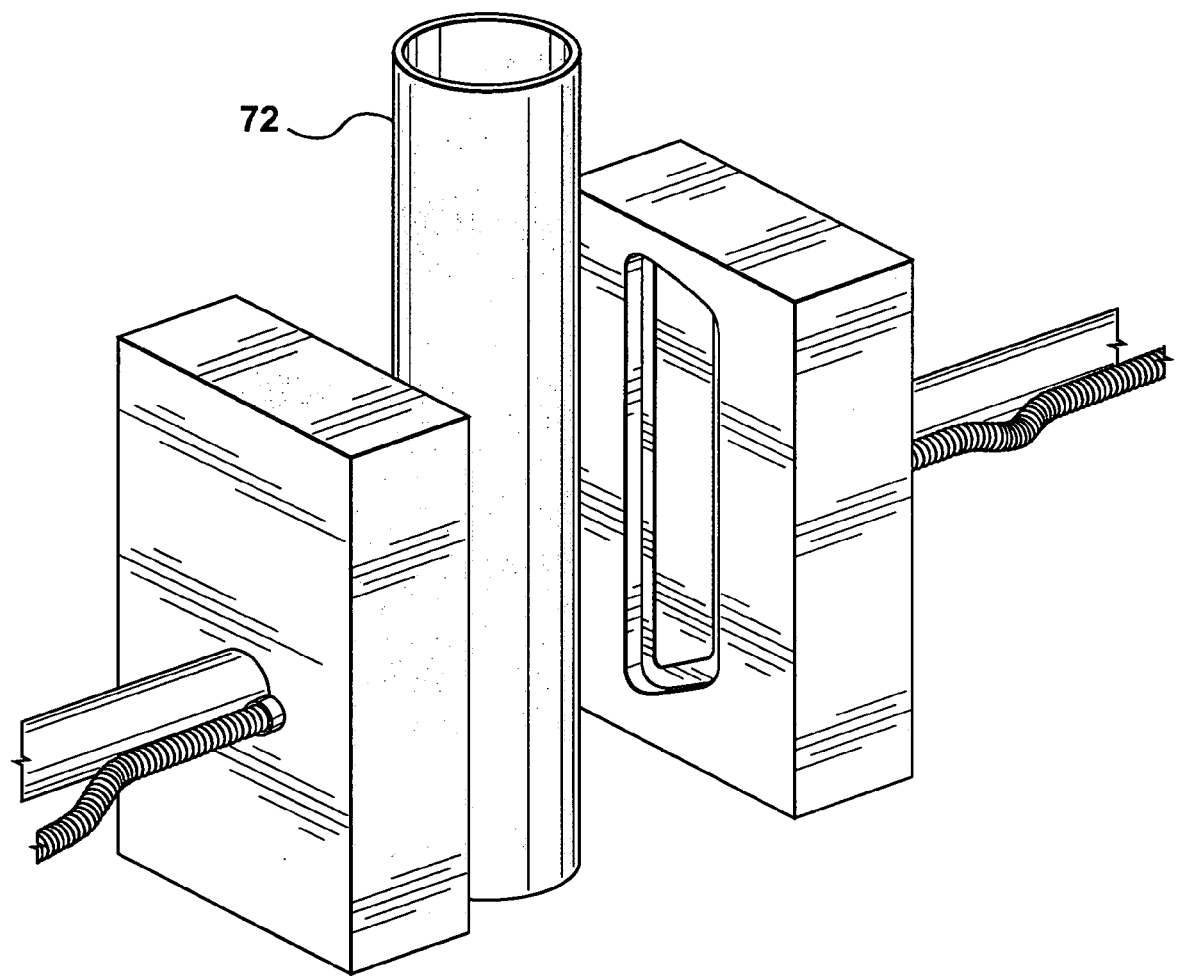

FIG. 5 illustrates the movement of the step plate 70 to a position between the mold halves 42 and 44. FIG. 6 illustrates the movement of the moldable step plate 70 into the cavity 60 of the mold half 44. FIG. 7 illustrates the final position of the step plate 70 entirely within the subcavity 62. The movement of the step plate 70 as shown diagrammatically in FIGS. 4, 5, 6 an 7 can most easily be accomplished using a programmable robotic arm. A supply of step plate 70 may be located where they be grasped and extracted by one or more robot arms. The robot arm moves the moldable step plate 70 until it is placed within the subcavity 62. Once the robot arm has placed the movable step plate 70 within the subcavity 62, then vacuum pressure, available from supply conduit 52 is applied to the subcavity 62, so that the moldable step plate 70 is retained and accurately positioned within the subcavity 62. The robot arm then retracts so that it is no longer located between the mold halves 42 and 44. When that has been completed, the parison 72 is extruded to extend between the mold halves as shown in FIGS. 7 and 8, FIG. 8 illustrates the completion of the extrusion of the parison and the mold halves are now ready to be closed about the parison.

Figure 9:
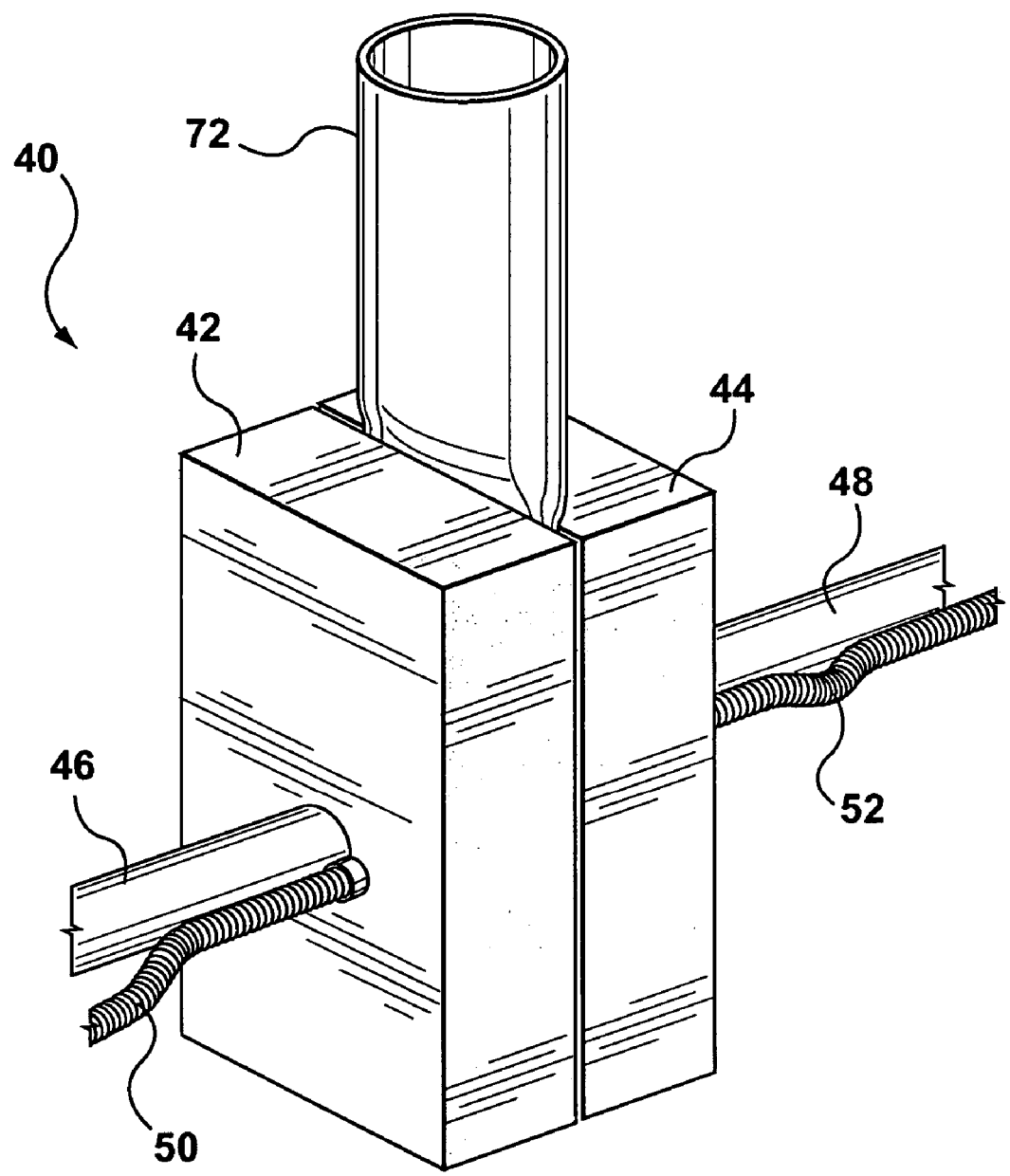
Figure 10:
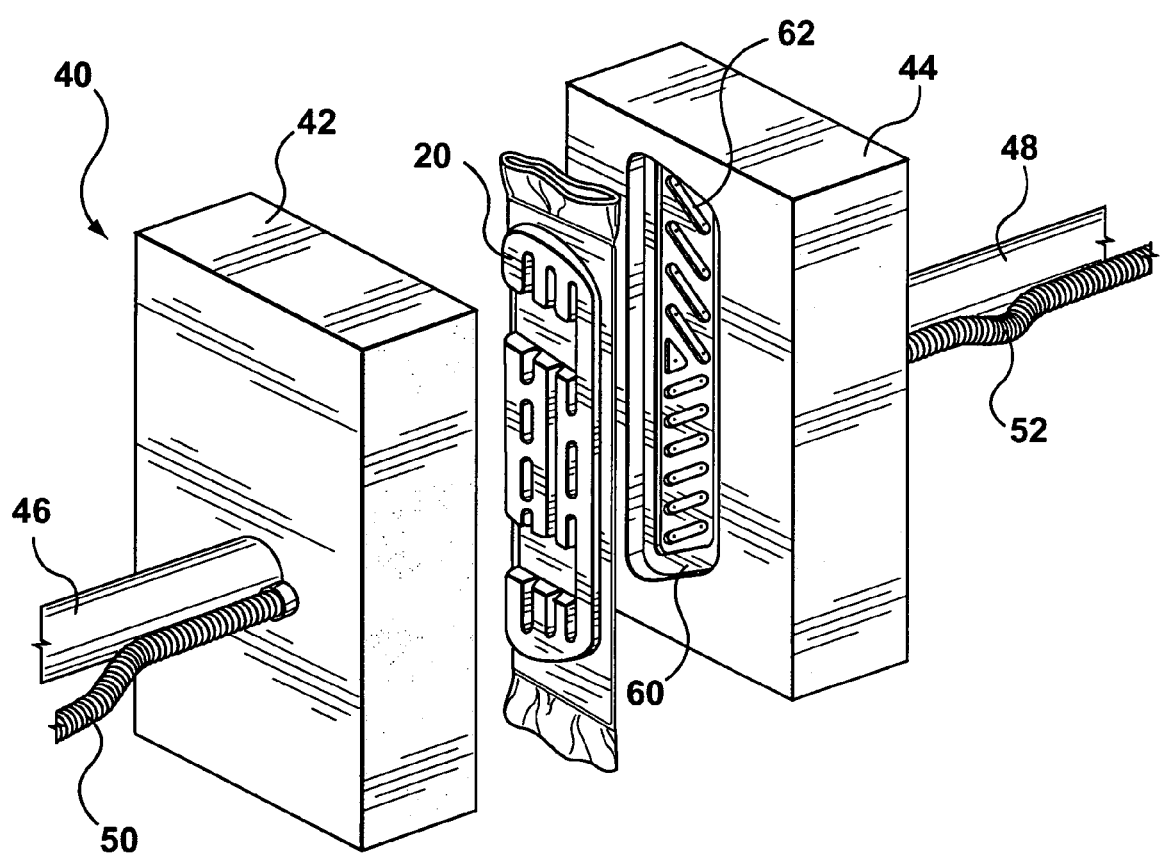

FIG. 9 illustrates the closure of the mold halves 42 and 4.4 to form a closed blow mold ready for application of a blow molding gas under appropriate pressure.

In this embodiment of the invention, the moldable step plate 70 is made from a material which may be thermal formed within the mold 42 and which is compatible with the material of the parison 72 so that the materials may fuse together to form an integral structure under suitable pressure and temperature.

The vacuum pressure applied to the subcavity 62 is intended primarily to hold the moldable step plate 70 in place. If the moldable step plate has not been raised to a temperature close to its molding temperature, no substantial molding of the step plate 70 will occur under the vacuum force alone. However, when the blow molding gas is supplied to the interior of the parison 72, the parison is at a moldable temperature and the parison will then expand within the mold 40. As the parison expands, a portion of the parison will then come into contact with the moldable step plate 70. This will result in the transfer of heat from the wall of the parison to the moldable step plate 70. In addition, as the parison 72 continues to expand, it will deliver substantial pressure to the moldable step plate 70 and forcing it against the pattern included within the subcavity 62.

Preferably the blow molding pressure is substantial. Most preferably the blow molding pressure may be at or above 90 psi.

The moldable step plate 70 as illustrated in FIG. 4, is a relatively thin strip of moldable plastic. The strip of plastic may be of the order of one to one and a half millimeters thick. The subcavity 62 is preferably less deep than the thickness of the strip. Preferably for a strip having a thickness of one to one and a half millimeters, the cavity may be of about one half millimeter depth. This means that upon completion of the molding, the step will project upwardly from the formed surface 30 by approximately one half millimeter or more, while the remainder of the step plate will be below and integrated into the wall of the parison. This is illustrated in FIG. 2.

After the blow molding pressure is released, in typical blow molding fashion, the mold 40 is cooled and opened. The opened mold is shown diagrammatically in FIG. 10 with the running board assembly 20 being shown having been ejected from the mold halves ready for trimming.

Figure 11:
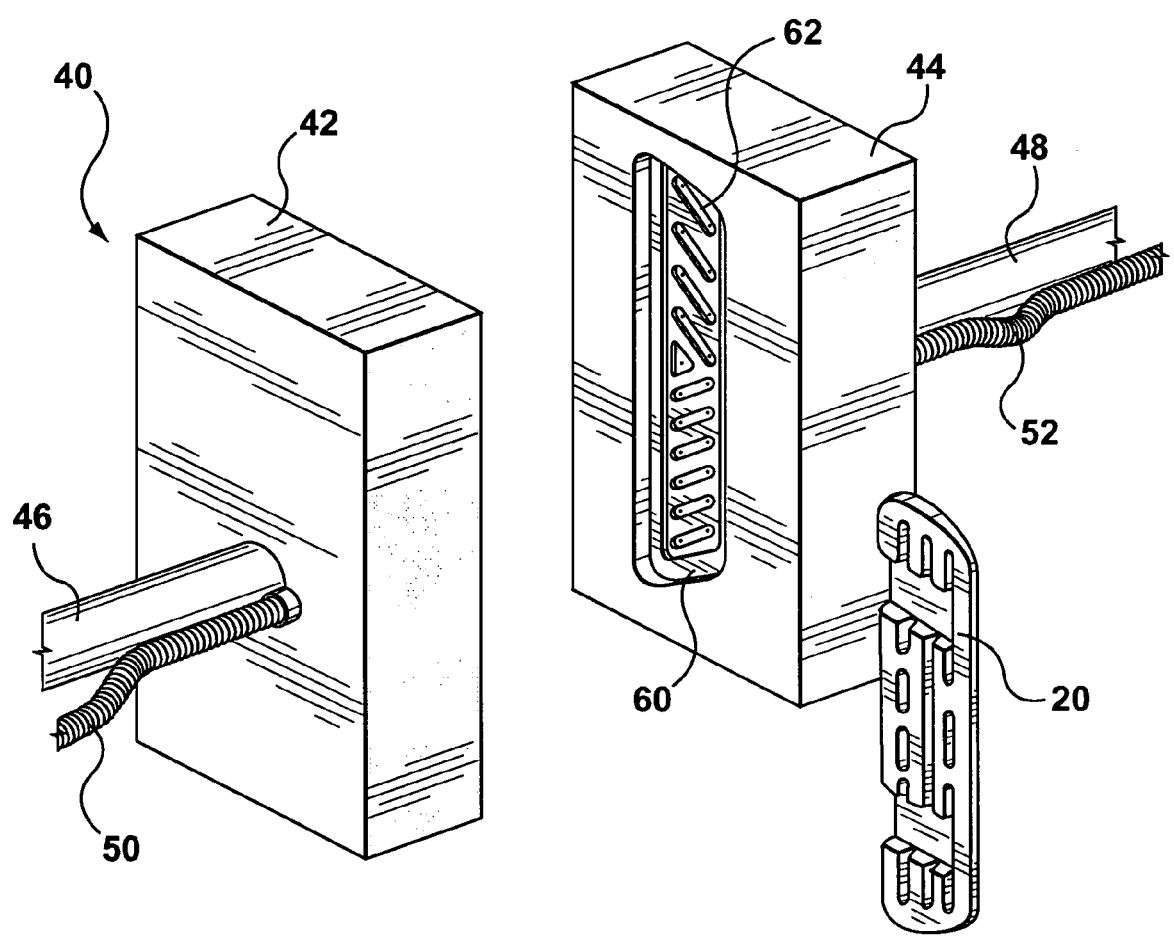

After ejection of the molded running board assembly 20, the running board assembly is trimmed as desired and removed from the mold. This is shown in FIG. 11.

The running board assembly 20 shown in FIG. 1 includes a step pad 24. The step pad 24 is incorporated into the running board assembly 20 by means of thermal fusion between the step pad 24 and the running board 22 which occurs during the blow molding process. In accordance with an alternate aspect of the invention, the step pad need not be comprised of a moldable material nor a material that will thermally fuse with the material of the running board.

Figure 12:
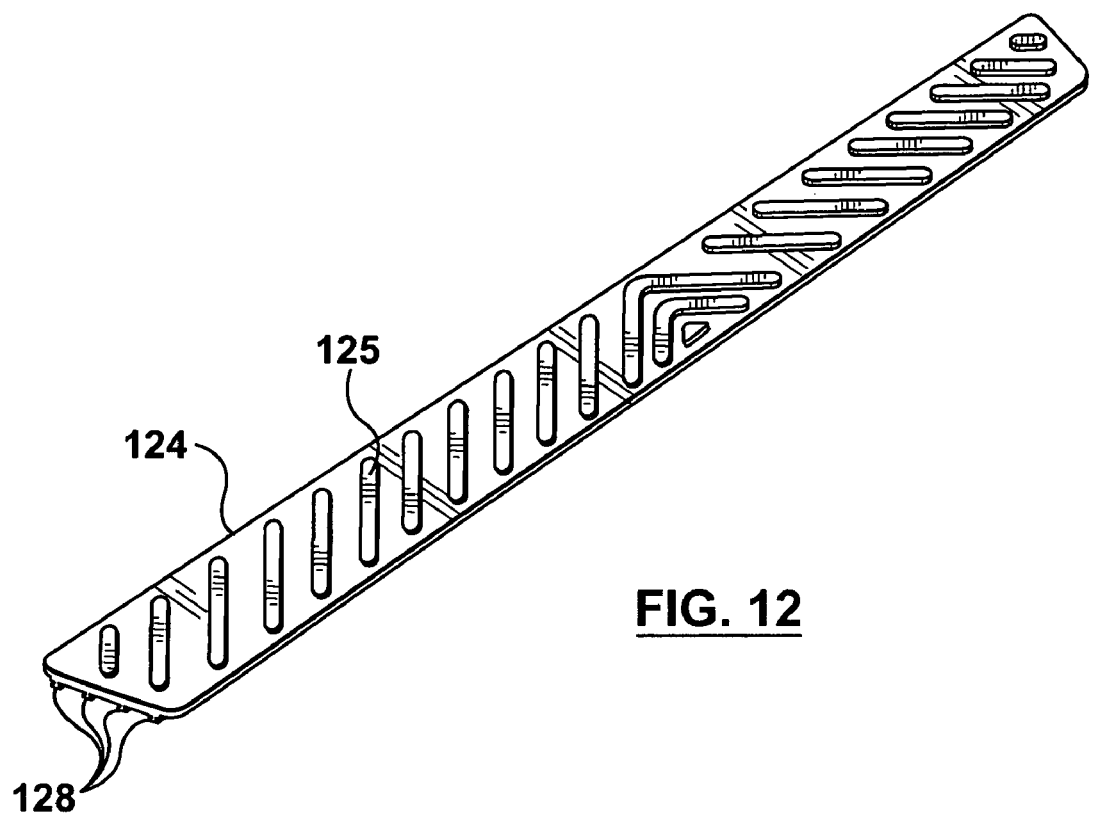
FIG. 12 illustrates an alternative component which may be used in accordance with the invention.

FIG. 12 illustrates a step pad 124. The step pad 124 is a metal strip. The metal strip includes a raised pattern 125 on one surface and at least one and preferably a plurality of longitudinally extending key shaped ribs 128 on the other surface.

Figure 13:
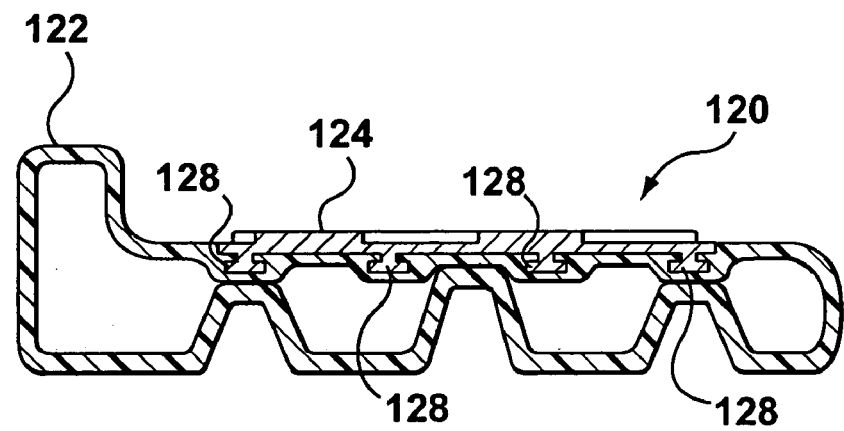
FIG. 13 is a cross-sectional view of a running board assembly which makes use of the component of FIG. 12 which may be manufactured in accordance with the invention.
Figure 14:
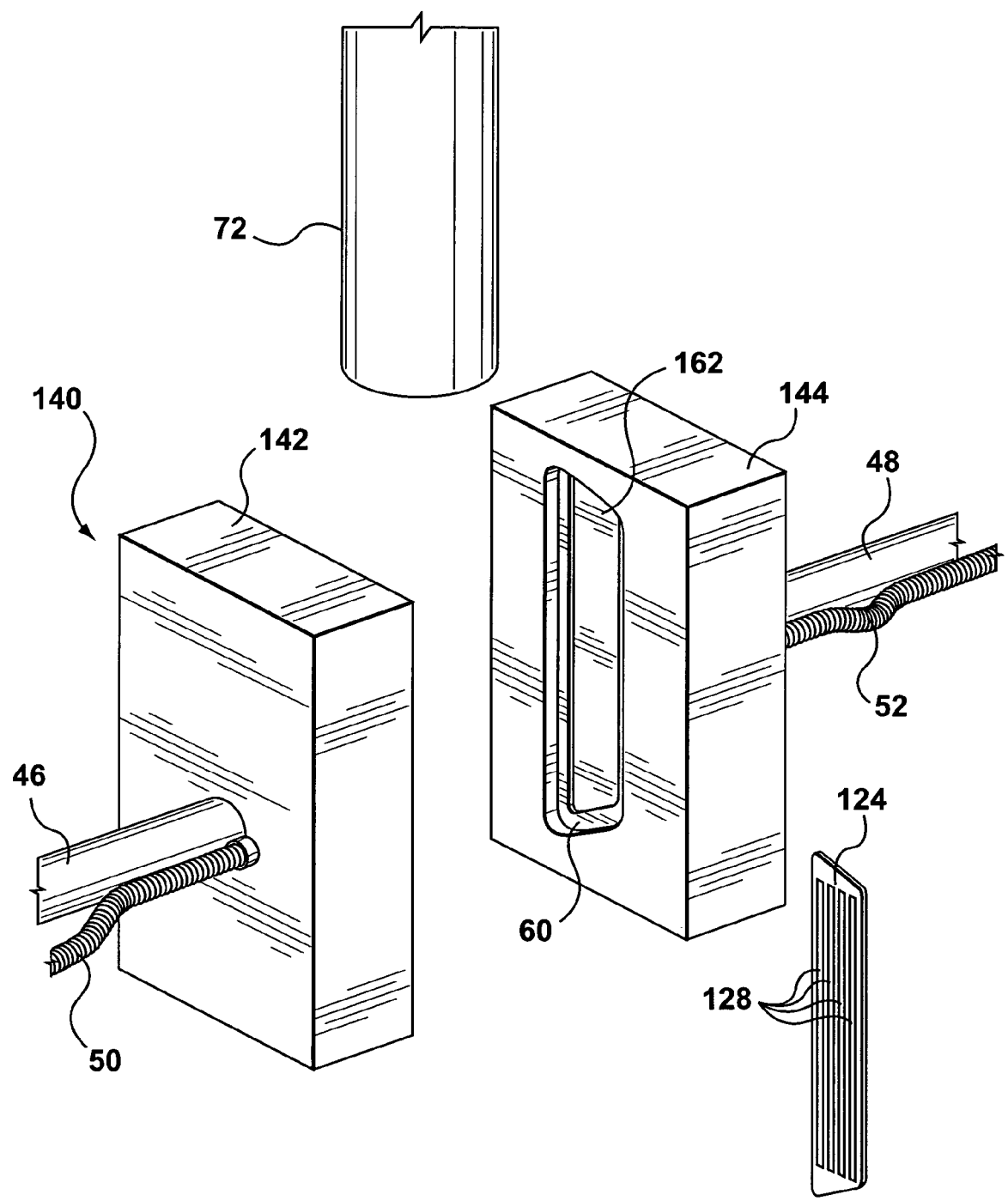
FIG. 14 is a perspective view similar to FIG. 4 showing an alternate embodiment.
Figure 15:
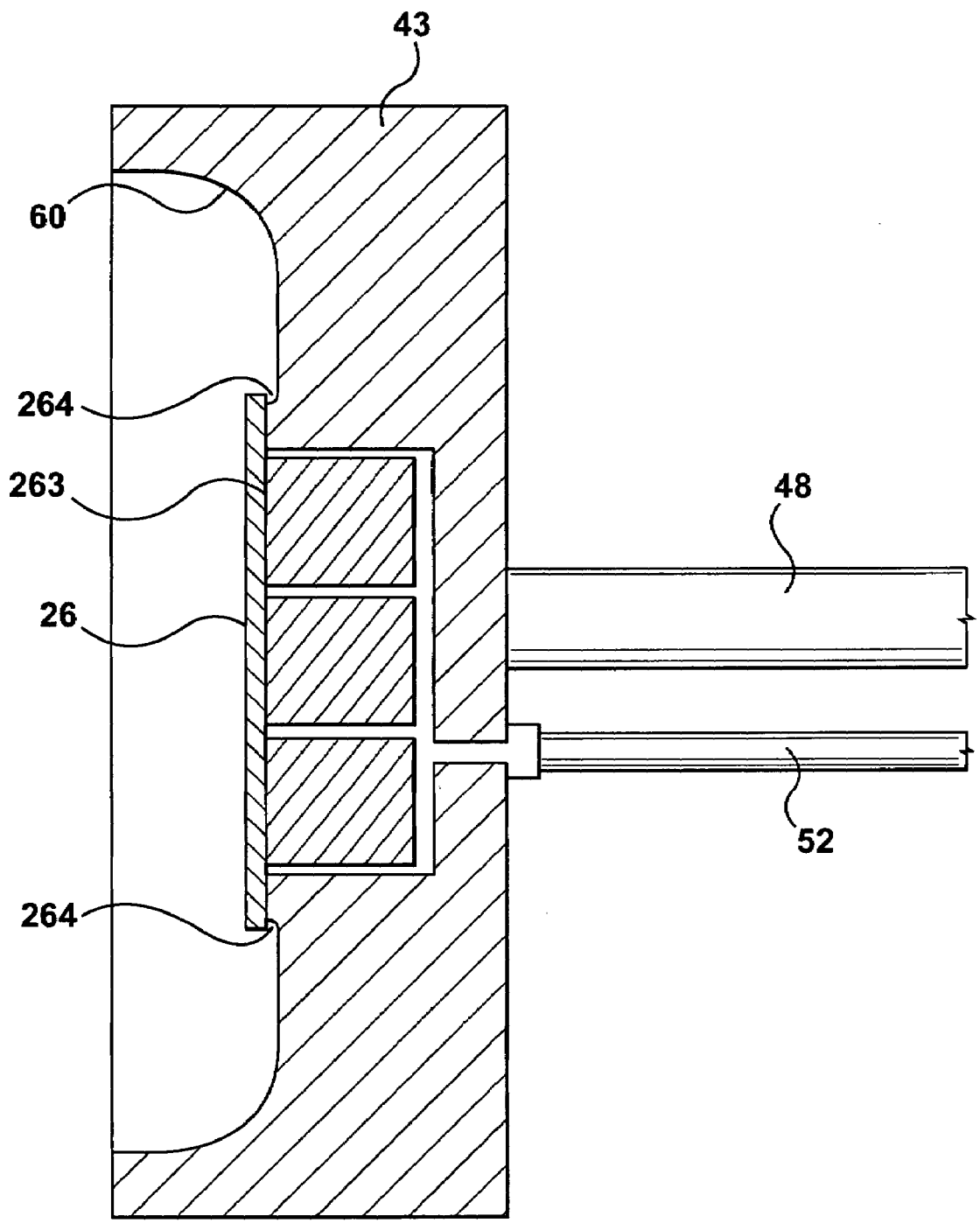
FIG. 15 is a cross section of a molding subcavity in accordance with another aspect of the invention for use in making the component illustrated in FIGS. 1, 2 and 3.

FIG. 13 illustrates in cross-section, a running board assembly 120. The running board assembly 120 includes the step pad 124 which has been incorporated during blow molding into a running board 122.

The process for manufacturing the running board assembly 120 illustrated in FIGS. 12 and 13 is similar to the process illustrated in FIGS. 4 through 11. In accordance with this aspect of the invention, the metal step pad 124 is placed within a subcavity 162 within one mold half 144 of a mold 140.

The step pad 124 may be obtained from a storage location and placed into the subcavity 162 by a computer controlled robot arm. Once the step pad 124 is placed within the subcavity 162, then vacuum pressure is applied to the subcavity 162 holding the step pad in place.

Once the step pad is held in place by the vacuum pressure, then a parison 72 is extruded between the mold halves 142 and 144, the mold is closed and a blowing pressure is applied to the interior of the parison. As the parison expands under the blowing pressure, a portion of the wall of the parison will encounter the surface of the step pad 124 which includes the plurality of key shaped ribs 128. The raised portions 125 of the step pad 124 will bear against the surface of the subcavity 162.

With reference to FIG. 13, it will be observed, that as the wall of the parison is forced under blowing pressure against the ribs 128, a portion of the wall will flow around the ribs. Each rib is substantially key-shaped. By this, it is meant that the portion of the rib which becomes embedded in the wall of the parison has an undercut or smaller width. In a preferred embodiment of the invention as shown in FIG. 13, the ribs are T-shaped. When the wall of the parison solidifies as the mold is cooled, then the cooled plastic of the parison wall extends into the undercut or thinner region of the rib thereby permanently incorporating the step pad 124 into the running board 120 as the running board is formed. Thus, when the mold opens, the part which is ejected is the running board assembly 120 with an integrated step pad 124.

Reference is now made to FIGS. 1, 2, 3 and 15. As shown, the running board assembly 20 includes a trim strip 26. The trim strip may be a moldable plastic which can thermally fuse with the parison 72 as the running board 22 is formed. Alternatively, the trim strip 26 may be manufactured from a material which does not thermally fuse with the running board 22. In this regard, the trim strip 26 may be a metallic strip similar to the step pad 124.

The trim strip 26 is in the form of an insert which may be positioned within a mold half 43 in a manner analogous to the step plate 70 or the step pad 124. In order to accomplish this, there may be a separate subcavity 263. The subcavity 263 may either be in the same mold half as the subcavity 62 or in the other mold half. While the trim strip 26 may use a similar retention means as the ribs 128 of step pad 124, an alternate retention system is shown in the enlarged view of FIG. 3 and 15.

The subcavity 263 into which the trim strip 26 may be placed and retained by vacuum pressure advantageously includes an undercut 264 extending around the perimeter of the subcavity 263. The running board assembly including both the step pad 24 or a step pad 124 and one or more trim strips 26, may be formed using the process discussed in connection with FIGS. 4 through 11. As the wall of the parison is expanded toward the trim strip 26, material from the parison will be forced against the surface of the trim strip 26. Under the blowing pressure, a small portion 80 of the parison material will be forced into the undercut. That portion of the parison then is adjacent the other surface of the trim strip 26. Sufficient length of undercut along the perimeter of the subcavity containing trim strip 26 is provided so that upon completion of the molding process, the trim strip 26 is permanently retained in the running board assembly 20. Most preferably, the undercut extends substantially around the perimeter of the subcavity so that in effect, the portion 80 of the parison material flows around substantially all of the perimeter edge of the trim strip 26. This in effect provides a permanent picture frame type retention of the trim strip 26.

The trim strip 26 is retained by the cooled material of the parison. Thus, the trim strip 26 may be manufactured from any desirable material which would include metals or plastics which are not compatible with the material of the running board 22 or materials which are compatible with the material of the running board 22.

As has been explained above, there are various aspects of preferred embodiments of the invention. The above description is to be taken as illustrative only with the full scope of the invention to be determined from reference to the following claims.

The invention claimed is:

1. A process for making a running board assembly of a running board and an insert comprising:
   providing complementary mold components having respective molding cavities, at least one of said mold components having at least a subcavity within the cavity of that mold component;
   providing an insert;
   inserting the insert into the subcavity;
   applying vacuum pressure to the subcavity to hold the insert in place;
   extruding a parison between the mold components;
   closing the mold components;
   expanding the parison within the cavity to simultaneously mold the running board and integrate the insert and the running board,
   wherein the insert is selected from the group consisting of one or more step plates, one or more trim strips and combinations of the foregoing.

2. The process of claim 1 wherein the insert is a step plate.

3. The process of claim 2 wherein the step plate is formed of a moldable anti-slip material which is compatible for thermal bonding with said parison.

4. The process of claim 3 wherein said moldable step plate is at a temperature below the molding temperature of the material of the moldable step plate when said moldable step plate is inserted in said subcavity.

5. The process of claim 4 wherein said subcavity comprises a molding pattern for molding a pattern on a surface of said moldable step plate.

6. The process of claim 5 wherein said step of expanding said parison causes said parison to contact said moldable step plate, transfer heat to said moldable step plate to raise its temperature to a temperature suitable for molding said moldable step plate and force said moldable step plate against said molding pattern of said subcavity to mold a surface of said step plate.

7. The process of claim 6 wherein said subcavity has a depth of less than 1 mm and said moldable step plate has a thickness of greater than 1 mm.

8. The process of claim 7 wherein the parison is expanded by blow molding using an internal pressure within the parison of greater than 90 psi.

9. The process of claim 2 wherein said step plate is metallic, said metallic step plate having a support surface and an attachment surface.

10. The process of claim 9 wherein said attachment surface comprises at least one key shaped rib.

11. The process of claim 10 wherein said parison is blow molded against said step plate and said at least one key shaped rib is encapsulated within said molded parison.

12. The process of claim 11 wherein said step plate comprises a plurality of said key shaped ribs and said plurality of key shaped ribs are encapsulated within said molded parison.

13. The process of claim 1 wherein said insert is a trim strip.

14. The process of claim 13 wherein said trim strip is not thermally bondable with said parison.

15. The process of claim 14 wherein said subcavity includes an undercut around at least a portion of the perimeter of said subcavity and said insert is supported in said subcavity so that upon expansion of said parison a portion of said parison may flow into said undercut.

16. The process of claim 15 wherein said parison is blow molded with a parison internal pressure of at least 90 psi.

17. The process of claim 15 wherein said undercut extends substantially around the perimeter of said subcavity so that said parison may flow into a portion of said subcavity when blow molded, adjacent a substantial portion of the edge of the insert so that the expanded parison retains the trim strip.

* * * * *